United States Patent [19]

Hsu

[11] Patent Number: 6,077,039
[45] Date of Patent: Jun. 20, 2000

[54] ELECTRIC FAN HAVING AN ATTRACTING ILLUMINATION AND SHOCK DEVICE

[76] Inventor: Ming Chun Hsu, 22, An Le Street, Lu Kang Township, Chang Hua Hsien, Taiwan

[21] Appl. No.: 09/114,703

[22] Filed: Jul. 13, 1998

[51] Int. Cl.$^7$ ................................................ A01M 1/04
[52] U.S. Cl. .................................. 416/5; 362/96; 43/112; 43/113
[58] Field of Search ..................................... 416/5, 146 R, 416/247 R; 362/96, 294; 43/112, 113

[56] References Cited

U.S. PATENT DOCUMENTS

| | | | |
|---|---|---|---|
| 3,041,773 | 7/1962 | Gagliano | 43/139 |
| 4,086,720 | 5/1978 | Wiser | 43/113 |
| 4,443,965 | 4/1984 | Gie | 43/139 |
| 4,908,978 | 3/1990 | Zacharias | 43/111 |

*Primary Examiner*—Edward K. Look
*Assistant Examiner*—Rhonda Barton
*Attorney, Agent, or Firm*—Harrison & Egbert

[57] ABSTRACT

An electric fan having induce illumination and shock device is composed of a fan provided with a transparent housing at the top end of the rod. The inner net with a fixed pieces around the edge thereon, is fastened with the outer net of the fan. The arrangement allows for the fan to blow the air, to illuminate the darkness at night, and to shock the mosquitoes without any obstacles.

1 Claim, 3 Drawing Sheets

ELECTRIC FAN HAVING AN ATTRACTING ILLUMINATION AND SHOCK DEVICE

FIELD OF THE INVENTION

The present invention relates generally to an electric fan, and more particularly to the electric fan that has an induce illumination and an electric shock function for catching mosquitoes.

BACKGROUND OF THE INVENTION

The conventional mosquitoes catcher light absolutely does its function, however, this catcher light is passive in inducing shock to mosquitoes except when the mosquitoes fly and come into the net. Such induce function in catching mosquitoes is defective in design since the prior art is not active but passive in operation.

SUMMARY OF THE INVENTION

The primary objective of the present invention is therefore to provide an induce illumination and an electric shock function for catching mosquitoes which is active in operation compared to the prior art described above.

In keeping with the principle of the present invention, the foregoing objective of the present invention is achieved by providing the present invention with a transparent housing provided at the top end of the fan's rod thereof, a shining member provided interior of the transparent housing, and a net with fixed pieces around the edge thereon. the fan can blow the air, to illuminate the darkness at night, and to shock the mosquitoes without any obstacles.

The foregoing objective, features and functions of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
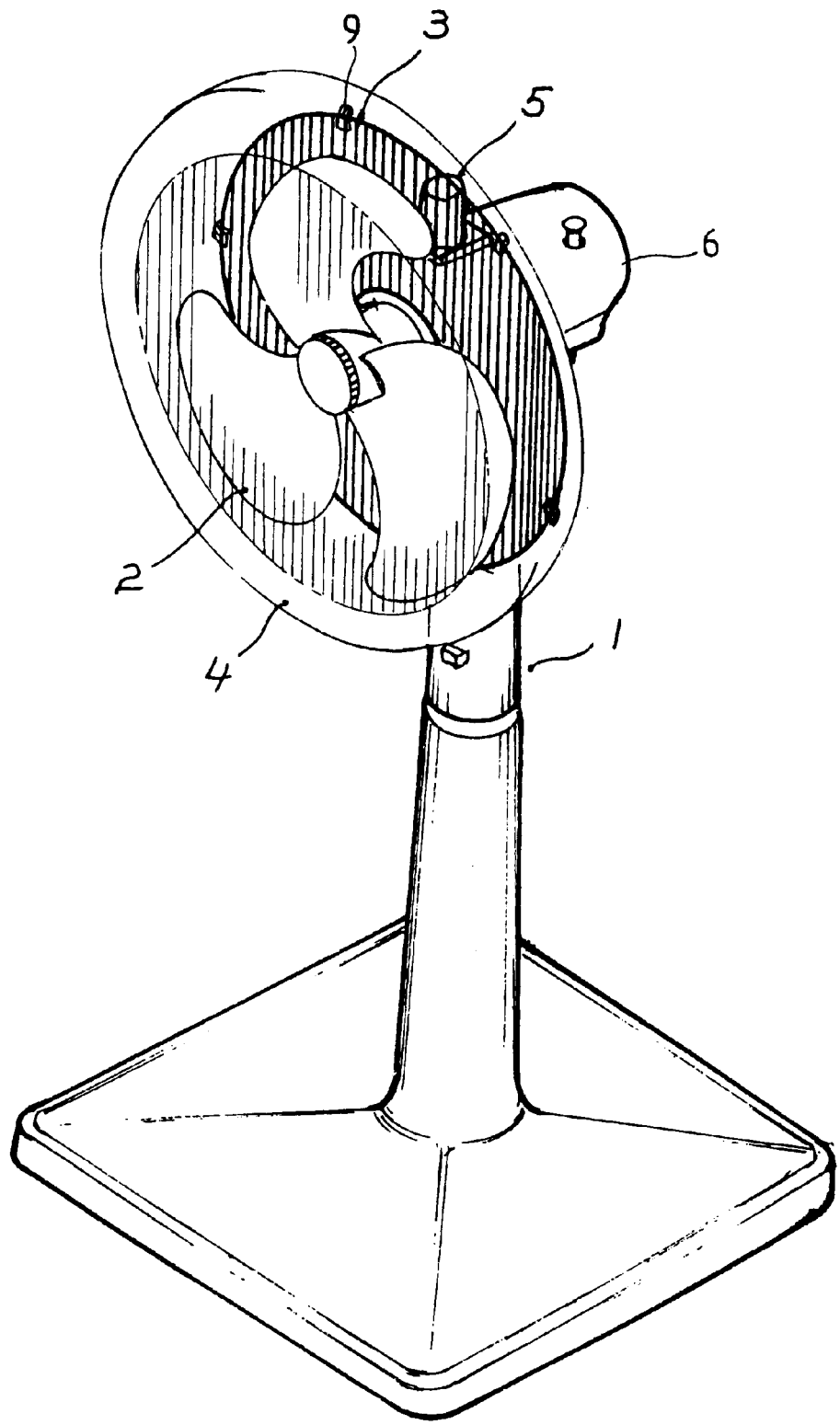
FIG. 1 shows a perspective view of the present invention.
Figure 2:
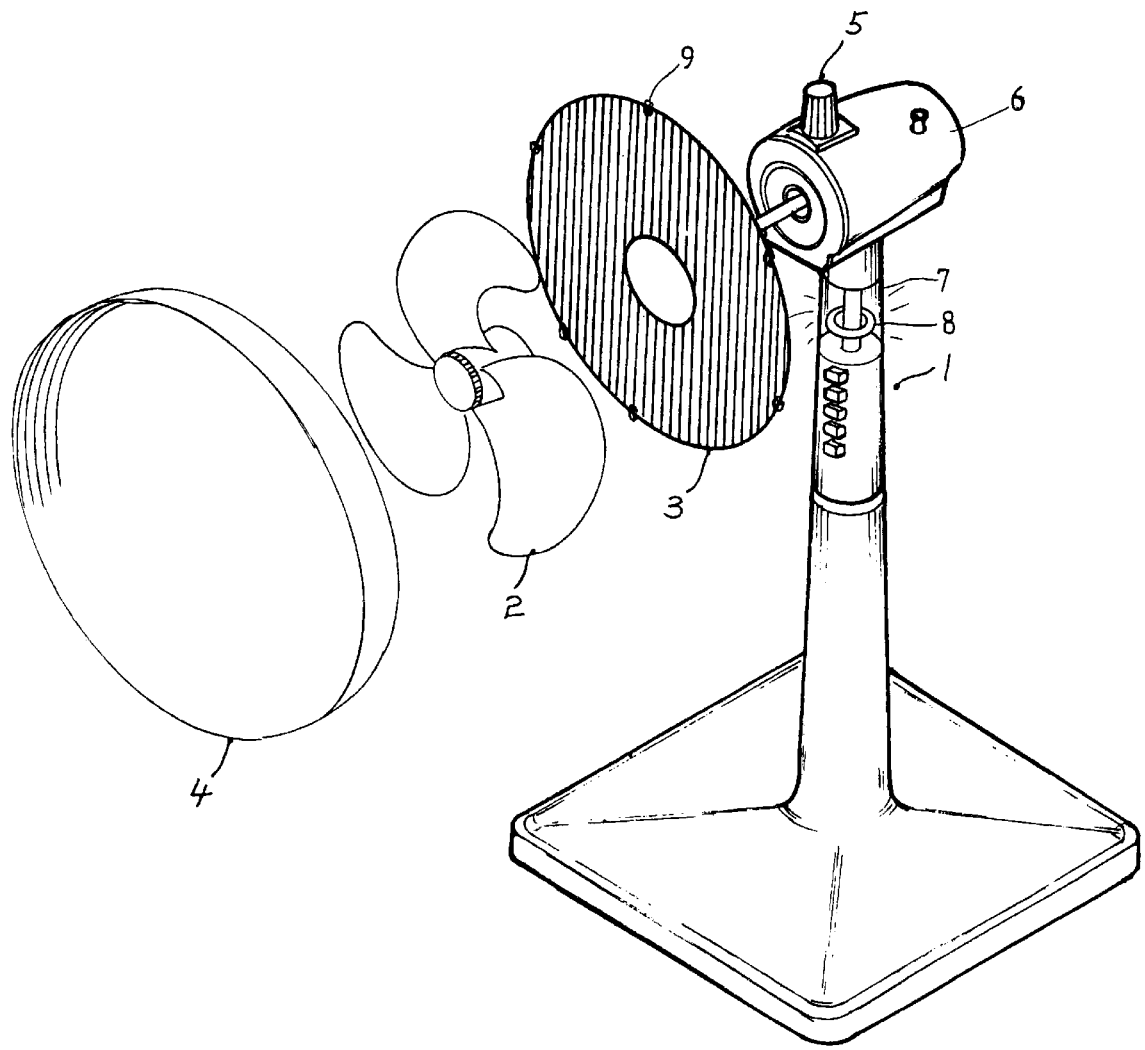
FIG. 2 shows an exploded view of the present invention.
Figure 3:
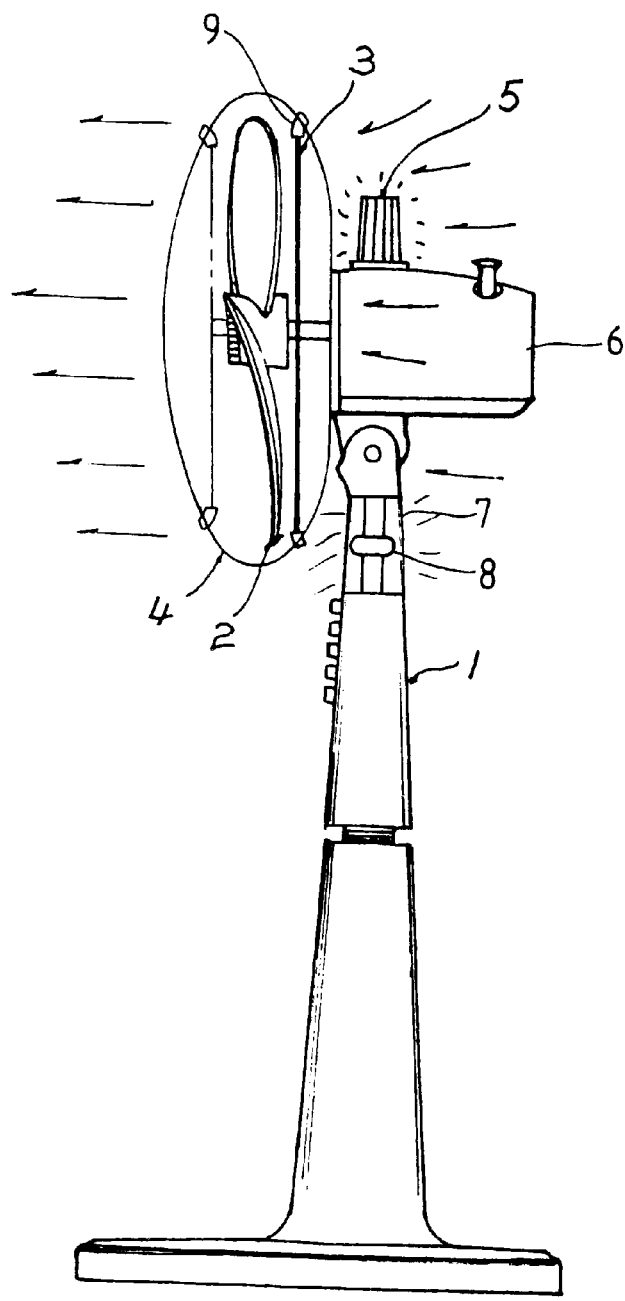
FIG. 3 shows a schematic view of the present invention in operation.

As shown in FIGS. 1 and 2, an electric fan having induce illumination and shock device embodied in the present invention is composed of:

a fan 1 that at the front of the rod provided with a motor shell 6 and a leaf 2. An outer net 4 is fixed at the front of the motor shell 6 for protecting the leaf 2.

A lamp 5 is provided at the upper side of the motor shell 6.

A shining member 8 is provided at inside of a transparent housing 7.

An inner net 3 has fixed pieces 9 around the edge thereon, is fastened with the front side or back side of the leaf 2 inside the outer net 4.

With the structural member as described above, the rod top end (under the motor shell 6) of the fan 1 is provided with a transparent housing 7 which has a shining member 8 inside of the transparent housing 7, together with the lamp 5 and power switching to control an induce illumination. So as to offer illumination at night, and to induce the mosquitoes without any obstacles. The inner net 3 has fixed pieces 9 around the edge thereon, is fastened with the outer net 4 of the fan 1 thereon so as to fix the inner net 3 firmly and safely in place. The fixed pieces 9 are fastened with the front side or back side of the leaf 2 inside the outer net 4, so as to make the filtered air flow become strong, and to strengthen the effect of shock in catching the mosquitoes.

The embodiment of the present invention described above is to be deemed in all respects as being illustrative and not restrictive. Accordingly, the present invention may be embodied in other specific forms without deviating from the spirit thereof. The present invention is therefore to be limited only by the scopes of the following appended claim.

What is claimed is:

1. An apparatus for attracting mosquitoes comprising:

a motor having a shell extending therearound, said motor having a shaft extending therefrom;

fan blades affixed to said shaft in front of said motor;

an outer housing affixed around said fan blades in front of said motor so as to enclose said fan blades;

a support structure connected to said shell so as to support said fan blades;

a lamp affixed to an upper side of said shell of said motor;

a light positioned within a transparent cover on said support structure; and a screen having securing pieces affixed on a periphery thereof, said securing pieces affixed to said outer housing such that said screen is interior of said outer housing and on one side of said fan blades.

* * * * *